(12) United States Patent
Lee et al.

(10) Patent No.: US 10,807,499 B2
(45) Date of Patent: Oct. 20, 2020

(54) EXTERNAL POWER SUPPLY SYSTEM AND SUPPLY METHOD OF FUEL CELL VEHICLE

(71) Applicants: Hyundai Motor Company, Seoul (KR); Kia Motors Corporation, Seoul (KR)

(72) Inventors: Kyu Il Lee, Gyeonggi-do (KR); Gun Hyung Park, Gyeonggi-do (KR)

(73) Assignees: Hyundai Motor Company, Seoul (KR); Kia Motor Corporation, Seoul (KR)

( * ) Notice: Subject to any disclaimer, the term of this patent is extended or adjusted under 35 U.S.C. 154(b) by 58 days.

(21) Appl. No.: 16/194,935

(22) Filed: Nov. 19, 2018

(65) Prior Publication Data
US 2020/0055422 A1    Feb. 20, 2020

(30) Foreign Application Priority Data
Aug. 17, 2018    (KR) .................. 10-2018-0096304

(51) Int. Cl.
*B60L 58/40*    (2019.01)
*B60L 58/12*    (2019.01)

(52) U.S. Cl.
CPC .............. *B60L 58/40* (2019.02); *B60L 58/12* (2019.02); *B60Y 2200/91* (2013.01)

(58) Field of Classification Search
CPC ....... B60L 58/40; B60L 58/12; B60Y 2200/91
See application file for complete search history.

(56) References Cited

U.S. PATENT DOCUMENTS

2016/0006060 A1*   1/2016   Kwon ................. H01M 8/0435
                                                                 429/442
2018/0326865 A1*  11/2018   Yoon ....................... B60L 53/20

FOREIGN PATENT DOCUMENTS

JP    5360183 B2   12/2013
JP    5572655 B2    8/2014

\* cited by examiner

*Primary Examiner* — Carlos Amaya
(74) *Attorney, Agent, or Firm* — Mintz Levin Cohn Ferris Glovsky and Popeo, P.C.; Peter F. Corless (57) ABSTRACT

An external power supply system of a fuel cell vehicle is provided. The system includes a fuel cell and a high voltage battery that is connected to the fuel cell via a main bus terminal A charging/discharging unit executes charging or discharging of the high voltage battery. A power supply line is branched from the main bus terminal and connected to a load outside the vehicle to supply power of the fuel cell or the high voltage battery to the load outside the vehicle. A controller operates the fuel cell and the charging/discharging unit based on a magnitude in power supplied to the load outside the vehicle and a state of charge (SOC) of the high voltage battery.

17 Claims, 5 Drawing Sheets

EXTERNAL POWER SUPPLY SYSTEM AND SUPPLY METHOD OF FUEL CELL VEHICLE

CROSS REFERENCE TO RELATED APPLICATION

The present application claims priority to Korean Patent Application No. 10-2018-0096304, filed on Aug. 17, 2018 the entire contents of which is incorporated herein for all purposes by this reference.

BACKGROUND

1. Technical Field

The present invention relates to an external power supply system and supply method of a fuel cell vehicle, and more particularly, to a power distribution control based on a magnitude in power supplied to a load outside the vehicle and a state of charge (SOC) of a high voltage battery together.

2. Description of the Related Art

A fuel cell is an energy conversion device that converts chemical energy of fuel into electrical energy by an electrochemical reaction without converting the chemical energy into heat by burning, and may be used to supply power to industrial, household, and automobile equipments, and also small electric/electronic products and mobile devices. In particular, in a polymer electrolyte membrane fuel cell (PEMFC) having a high power density, an innermost part of the PEMFC includes a membrane electrode assembly (MEA) which is a main component part. The membrane electrode assembly includes a polymer electrolyte membrane which may move proton, and a cathode and an anode which are electrode layers coated with a catalyst so that hydrogen and oxygen may react on both surfaces of the electrolyte membrane.

A fuel cell vehicle in which such a fuel cell is mounted on a vehicle uses power generated by the fuel cell to drive a motor, thereby obtaining power. However, such a fuel cell vehicle may be utilized as a power supply system that is connected to a load located extraneous to the vehicle and configured to supply power to a load outside the vehicle. In other words, the fuel cell vehicle may be configured to supply power to the load outside the vehicle as a movable generator. However, when the fuel cell vehicle is operated with such a movable generator, there is a demand for a technology of supplying power to the outside of the vehicle by a power distribution control or a fuel idle stop control suitable for each situation.

The matters described as the related art have been provided merely for assisting in the understanding for the background of the present invention and should not be considered as corresponding to the related art known to those skilled in the art.

SUMMARY

An object of the present invention is to provide an external power supply system and supply method of a fuel cell vehicle capable of controlling an operation of a fuel cell and a charging/discharging unit based on a magnitude in power supplied to a load outside the vehicle and a state of charge (SOC) of a high voltage battery together.

According to an exemplary embodiment of the present invention, an external power supply system of a fuel cell vehicle may include: a fuel cell; a high voltage battery connected to the fuel cell via a main bus terminal; a charging/discharging unit configured to execute charging or discharging of the high voltage battery; a power supply line branched from the main bus terminal and connected to a load outside the vehicle to supply power of the fuel cell or the high voltage battery to the load outside the vehicle; and a controller configured to operate the fuel cell and the charging/discharging unit based on a magnitude in power supplied to the load outside the vehicle and a state of charge (SOC) of the high voltage battery.

The charging/discharging unit may be a direct current (DC) converter disposed at the main bus terminal between the fuel cell and the high voltage battery. The power supply line may be connected in parallel between the fuel cell and the charging/discharging unit to supply power from the fuel cell or the high voltage battery to the load outside the vehicle. The controller may be configured to adjust a ratio of power supplied from the fuel cell to be increased as the magnitude in power supplied to the load outside the vehicle is increased. The controller may also be configured to adjust a ratio of power supplied from the high voltage battery to be increased as the magnitude in power supplied to the load outside the vehicle is decreased.

Additionally, the controller may be configured to divide a control mode into a plurality of control modes based on the magnitude in power supplied to the load outside the vehicle, and stop the operation of the fuel cell and allow only the high voltage battery to supply power to the load outside the vehicle when a state of charge of the high voltage battery is equal to or greater than a predetermined first SOC, in a low power mode among the plurality of modes. The controller may be configured to allow the high voltage battery to supply power to the load outside the vehicle when the charging/discharging unit suppresses boosting of an output voltage of the high voltage battery.

The controller may be configured to divide a control mode into a plurality of control modes based on the magnitude in power supplied to the load outside the vehicle, and supply power to the load outside the vehicle while charging the high voltage battery with the fuel cell when a state of charge of the high voltage battery is less than a predetermined second SOC, in a low power mode among the plurality of modes. The controller may further be configured to divide a control mode into a plurality of control modes based on the magnitude in power supplied to the load outside the vehicle, and operate a charging/discharging unit to suppress the charging or discharging of the high voltage battery when the state of charge of the high voltage battery is equal to or greater than a predetermined third SOC, in a medium power mode among the plurality of modes.

The controller may be configured to stop the operation of the fuel cell and allow only the high voltage battery to supply power to the load outside the vehicle, when the charge of state of the high voltage battery is equal to or greater than a predetermined fourth SOC higher than the third SOC. The controller may further be configured to divide a control mode into a plurality of control modes based on the magnitude in power supplied to the load outside the vehicle, and operate a charging/discharging unit to suppress the charging or discharging of the high voltage battery when the state of charge of the high voltage battery is less than a fifth SOC, in a high power mode among the plurality of modes.

The charging unit may be operated to supply power to the load outside the vehicle by the high voltage battery when the state of charge of the high voltage battery is equal to or greater than the fifth SOC, and the operation of the fuel cell may be stopped when the magnitude in power supplied to the load outside the vehicle is less than the preset power value. The controller may be configured to operate the fuel cell to supply power to the load outside the vehicle while charging the high voltage battery when the charge of state of the high voltage is less than a sixth SOC which may be less than the fifth SOC.

According to another exemplary embodiment of the present invention, an external power supply method of a fuel cell vehicle may include: deriving a magnitude in power to be supplied to a load outside the vehicle; determining a state of charge of the high voltage battery; and operating the fuel cell and a DC converter based on the derived magnitude in power supplied to the load outside the vehicle and the determined state of charge of the high voltage battery together.

In the operating of the fuel cell and the DC converter, the control mode may be divided into a plurality of control modes based on the magnitude in power supplied to the load outside the vehicle, and the operation of the fuel cell and the DC converter may be adjusted so that as the magnitude in power supplied to the load outside the vehicle is increased, the ratio of power supplied from the fuel cell is increased and as the magnitude in power supplied to the load outside the vehicle is reduced, the ratio of power supplied from the high voltage battery is increased.

The external power supply method may further include: after operating the fuel cell and the DC converter, determining the state of the fuel cell; and operating the fuel cell based on the determined state of the fuel cell. In response to determining that the fuel cell is in a dry state in the determining of the state of the fuel cell, the fuel cell may be stopped and the DC converter may be operated to suppress boosting of an output voltage of the high voltage battery. In response to determining that the fuel cell is in a flooding state when determining of the state of the fuel cell, the supply of air to the fuel cell may be adjusted by adding a preset recovery control current to a required current of the fuel cell.

BRIEF DESCRIPTION OF THE DRAWINGS

The above and other features of the present disclosure will now be described in detail with reference to exemplary embodiments thereof illustrated in the accompanying drawings which are given herein below by way of illustration only, and thus are not limitative of the present disclosure, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specifically structural and functional descriptions in exemplary embodiment of the present invention disclosed in the present specification or the present application are illustrated to describe exemplary embodiments of the present invention and therefore, the exemplary embodiments of the present invention may be practiced in various forms and are not to be construed as being limited to the exemplary embodiment of the present invention disclosed in the present specification or the present application.

Since exemplary embodiments of the present invention may be various modified and may have several forms, specific exemplary embodiments will be shown in the accompanying drawings and will be described in detail in the present specification or disclosure. However, it is to be understood that the present invention is not limited to the specific exemplary embodiments, but includes all modifications, equivalents, and substitutions included in the spirit and the scope of the present invention.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present invention.

It is to be understood that when one component is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between", "directly between", "neighboring to", "directly neighboring to" and the like, should be similarly interpreted.

Unless indicated otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, exemplary embodiments of the present invention will be described in detail with reference to the accompanying drawings. Like reference numerals proposed in each drawing denote like components.

Figure 1:
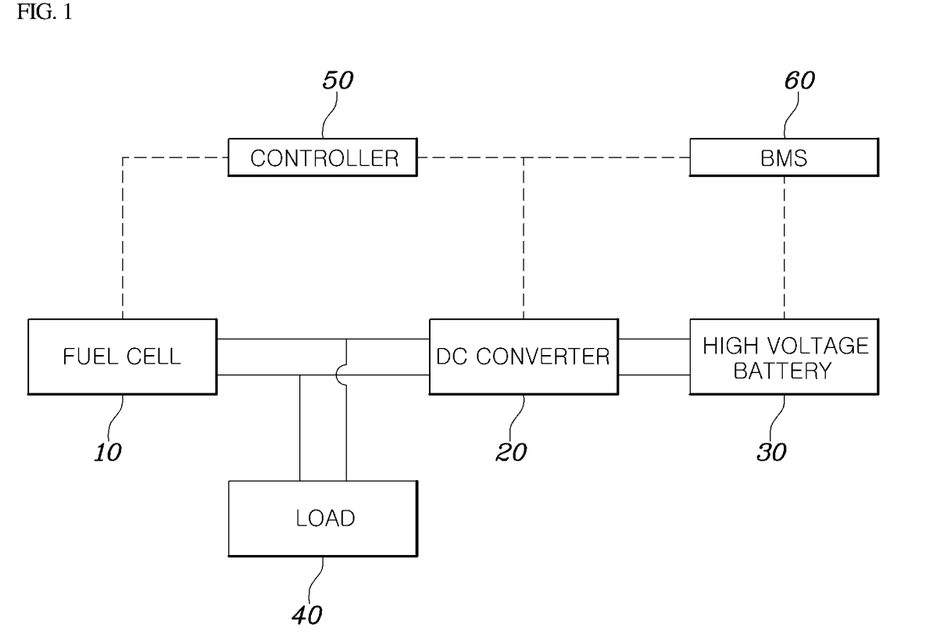
FIG. 1 is a configuration diagram of an external power supply system of a fuel cell vehicle according to an exemplary embodiment of the present invention.

FIG. 1 is a configuration diagram of an external power supply system of a fuel cell 10 vehicle according to an exemplary embodiment of the present invention. Referring to FIG. 1, an external power supply system of a fuel cell 10 vehicle according to an exemplary embodiment of the present invention may include: a fuel cell 10; a high voltage battery 30 connected to the fuel cell 10 via a main bus terminal; a charging/discharging unit 20 configured to charge or discharge the high voltage battery 30; a power supply line branched from the main bus terminal and connected to a load 40 outside the vehicle to supply power of the fuel cell 10 or the high voltage battery 30 to the load 40 outside the vehicle; and a controller 50 configured to operate the fuel cell 10 and the charging/discharging unit 20 based on a magnitude in power supplied to the load 40 outside the vehicle and a state of charge (SOC) of the high voltage battery 30.

The fuel cell 10 may be a fuel cell 10 stack which is supplied with hydrogen and oxygen, respectively, and may be configured to produce power energy by an electrochemical reaction of hydrogen with oxygen therein. The fuel cell 10 may be connected to the high voltage battery 30 via the main bus terminal A main bus terminal may be further connected to a motor and other accessory devices that drive the vehicle. The high voltage battery 30 may be configured to supply power to the main bus terminal while charging power generated by the fuel cell 10 or discharging the charged power via the main bus terminal. The charging/discharging unit 20 may be configured to adjust the charging or discharging of the high voltage battery 30. The high voltage battery 30 may further include a battery management system (BMS) 60 configured to monitor the state of charge (SOC) of the fuel cell 10 and execute the charging/discharging unit 20 s to adjust the state of charge (SOC).

The controller 50 may be included in a vehicle controller (e.g., fuel cell controller (FCU)) of the fuel cell 10 or may be a controller formed separately. It may be possible to operate the fuel cell 10 and the charging/discharging unit 20 based on the magnitude in power supplied to the load 40 outside the vehicle and the state of charge (SOC) of the high voltage battery 30 together. The fuel cell 10 may generally be operated when the vehicle of the fuel cell 10 is turned on, but when the state of charge of the high voltage battery 30 is sufficient and the required current of the fuel cell 10 is minimal, the operation of the fuel cell 10 may be stopped. The stop state of the fuel cell 10 when a start of the vehicle is not terminated is referred to as an idle stop (e.g., FC idle stop) mode. The fuel cell 10 may be operated to generate a current equal to or greater than a predetermined magnitude based on the corresponding mode, thereby improving fuel economy.

In the idle stop mode of the fuel cell 10, hydrogen may be continuously supplied through a recirculation line and the air supply line may be shut off to stop operation of an air compressor or an air blower, and an air shut off valve of the air supply line may adjust the air supplied to the fuel cell 10 to be shut off. The load 40 outside the vehicle is the load 40 that supplies power to the outside of the vehicle, and the load supplied power from the fuel cell 10 or the high voltage battery 30 when the fuel cell 10 vehicle is operated as a mobile generator. The corresponding load 40 may separately include a power converter such as an inverter. It may be possible to determine whether the load 40 is connected to the power supply line branched from the main bus terminal by a separate sensor or the like.

Accordingly, whether the power supply line is connected to the load 40 outside the vehicle may be determined, and in response to determining that the power supply line is connected to the load 40 outside the vehicle, the power supply line may be operated by an external power supply mode. The charging/discharging unit 20 may be a direct current (DC) converter disposed at the main bus terminal between the fuel cell 10 and the high voltage battery 30. The DC converter 20 may be configured to change a voltage of DC power by a DC/DC converter. The power supply line may be connected in parallel between the fuel cell 10 and the charging/discharging unit 20 to be able to supply power from the fuel cell 10 or the high voltage battery 30 to the load 40 outside the vehicle. In other words, the power supply line may be connected to the main bus terminal between the fuel cell 10 and the charging/discharging unit 20 to be able to be supplied with power from the fuel cell 10 or power from the high voltage battery 30 by the charging/discharging unit 20.

Figure 2:
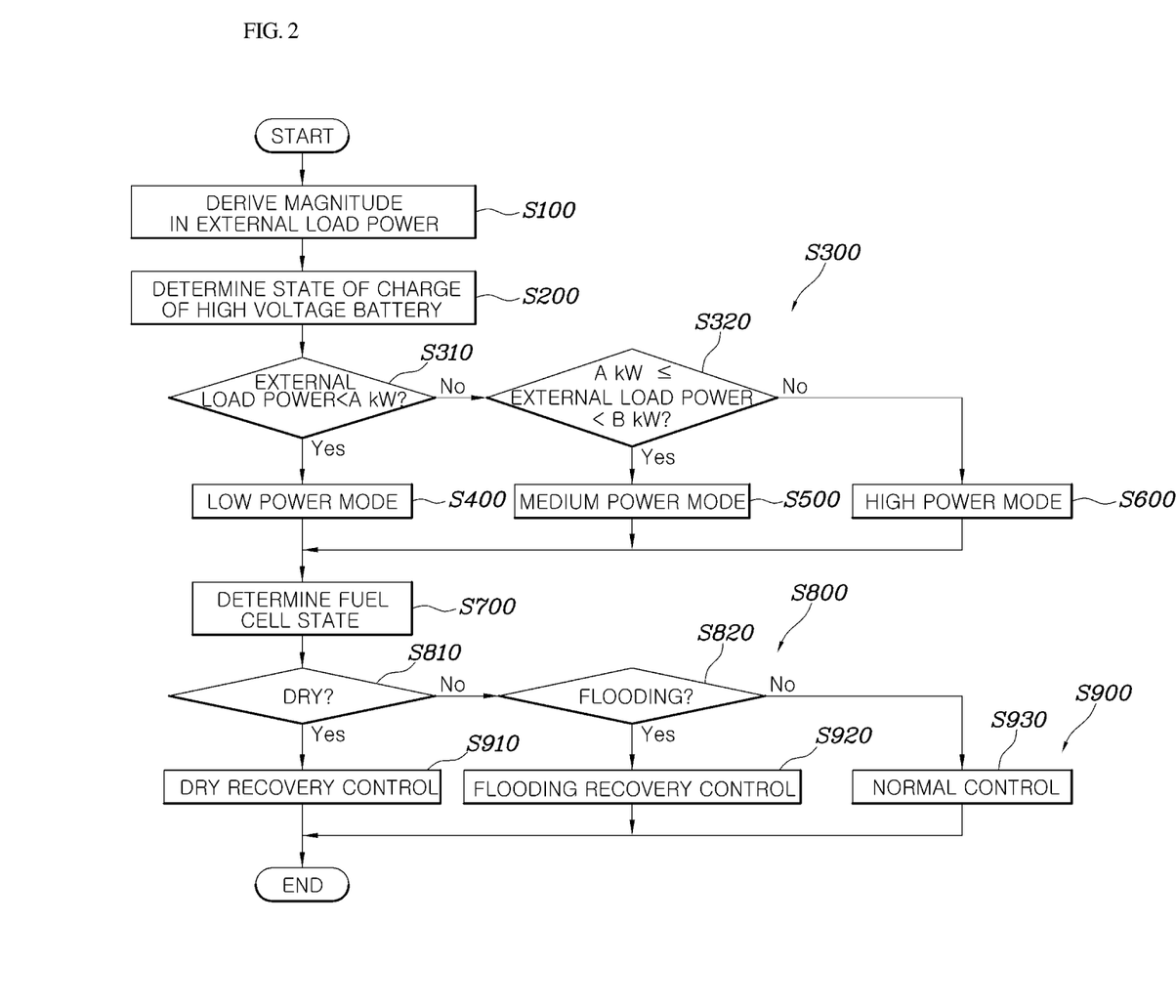
FIG. 2 is a flow chart of an external power supply method of a fuel cell vehicle according to an exemplary embodiment of the present invention.
Figure 3:
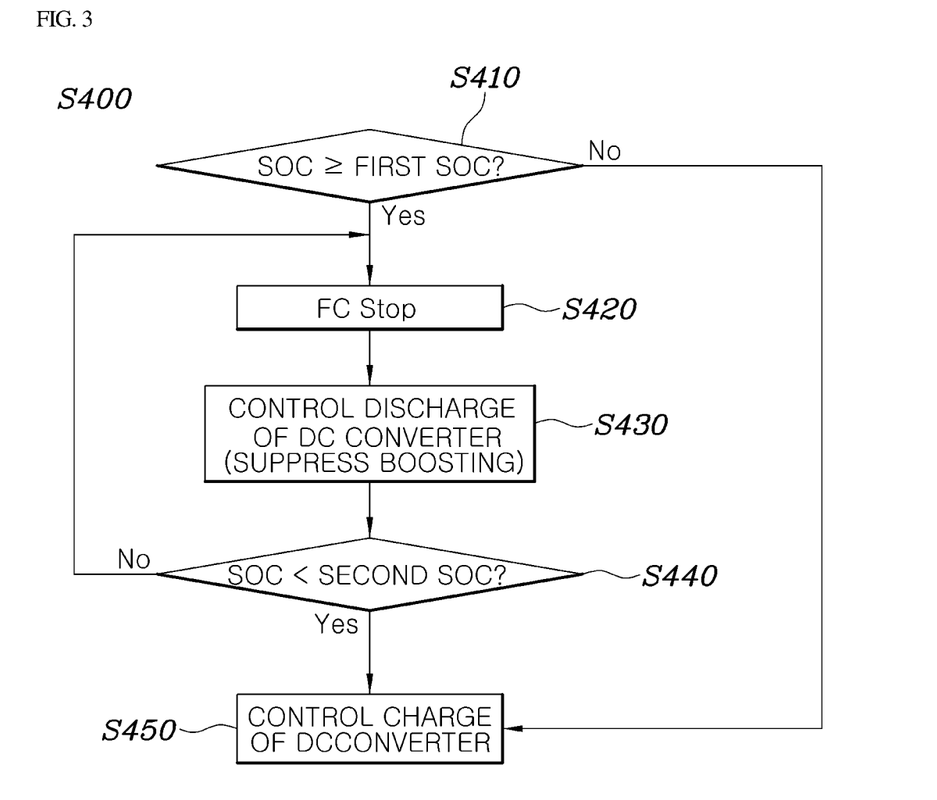
FIGS. 3 to 5 are diagrams showing in detail a flowchart of FIG. 2 according to an exemplary embodiment of the present invention.
Figure 4:
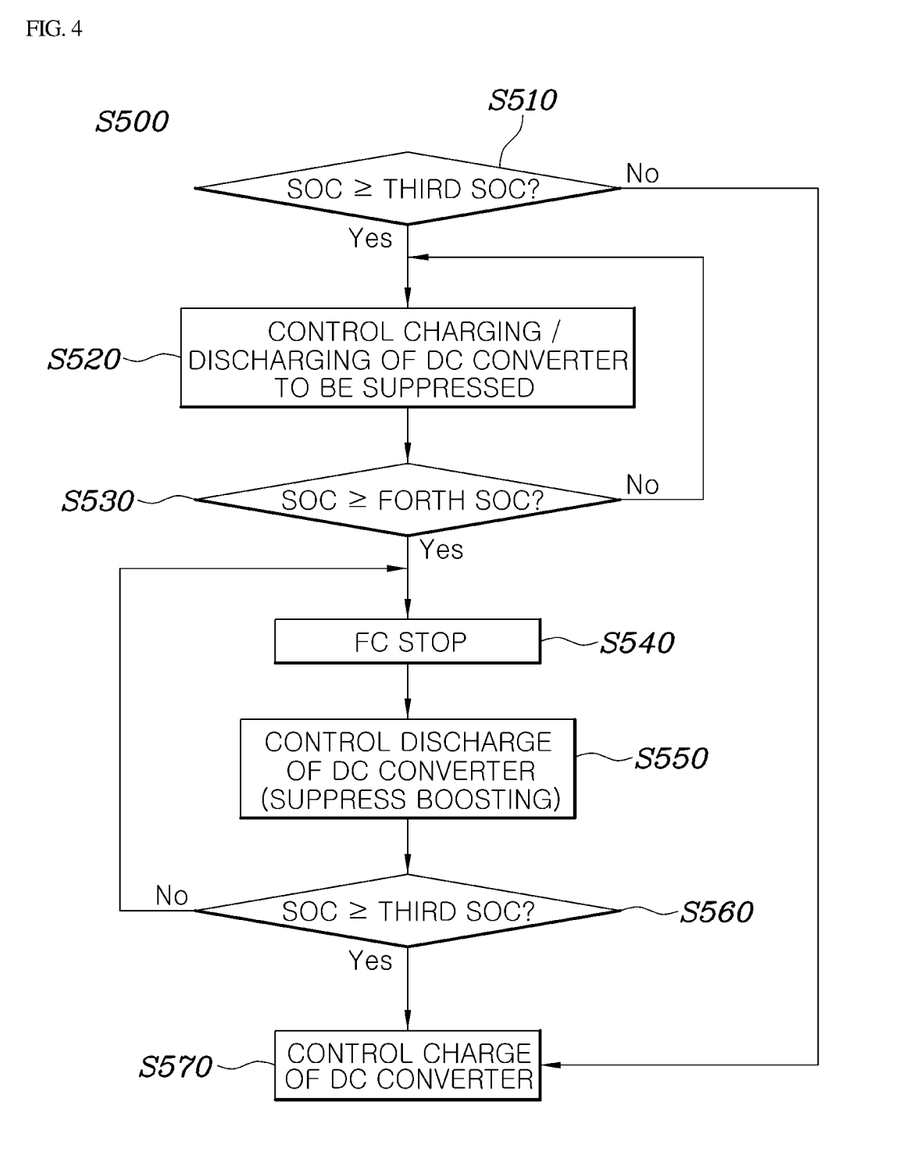
Figure 5:
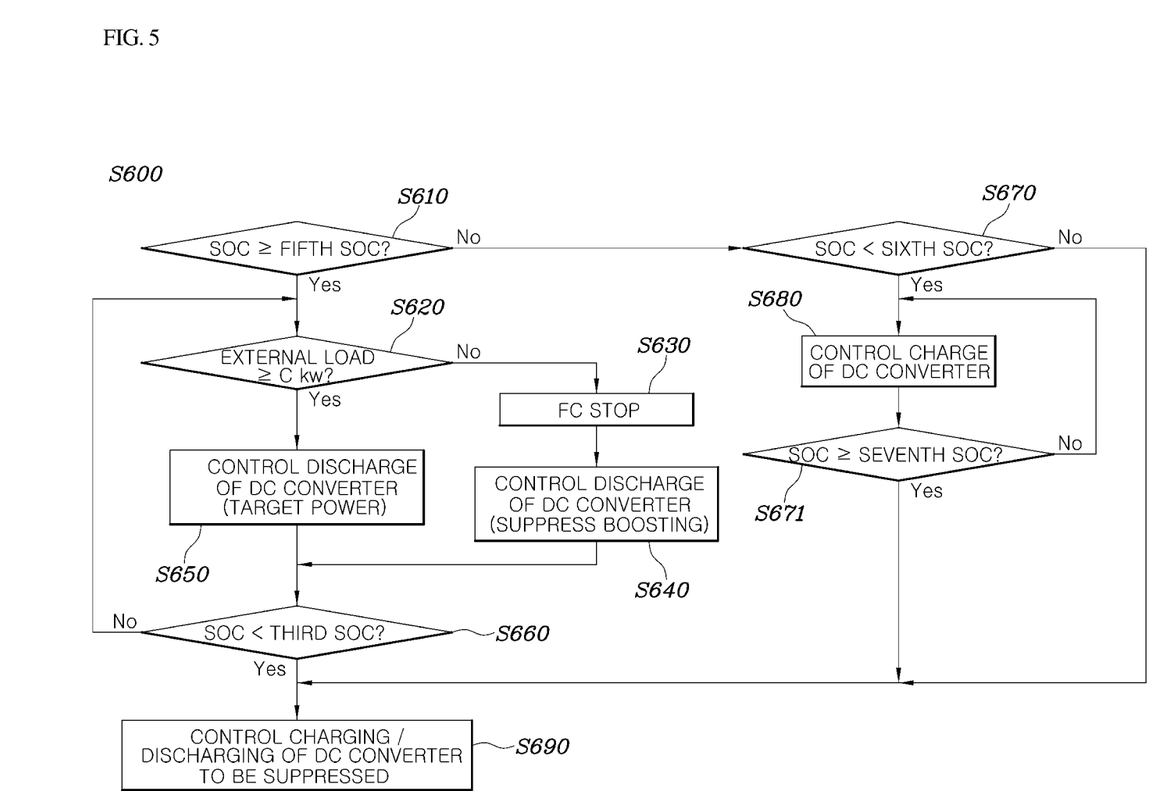

FIG. 2 is a flow chart of an external power supply method of a fuel cell 10 vehicle according to an exemplary embodiment of the present invention and FIGS. 3 to 5 are diagrams showing in detail a flowchart of FIG. 2. The method described herein below may be executed by a controller having a processor and a memory. Referring to FIGS. 2 to 5, an external power supply method of a fuel cell 10 vehicle according to an exemplary embodiment of the present invention may include deriving a magnitude in power to be supplied to a load 40 outside the vehicle (S100); determining a state of charge of the high voltage battery 30 (S200); and operating the fuel cell 10 and a DC converter 20 based on the derived magnitude in power supplied to the load 40 outside the vehicle and the determined state of charge of the high voltage battery 30 together (S400, S500, and S600).

In the operation of the fuel cell 10 and the DC converter 20 (S400, S500, and S600), the control mode may be divided into a plurality of control modes based on the magnitude in power supplied to the load 40 outside the vehicle. Particularly, the magnitude in power supplied to the load 40 outside the vehicle may be a value obtained by summing the magnitude in other power consumed by accessory devices or the like with the magnitude in power actually supplied to the load 40. In other words, the value may be a value obtained by adding the magnitudes of all power consumed by being connected to the main bus terminal in addition to the load 40 outside the vehicle, in the mode of supplying power to the load 40 outside the vehicle.

The control mode may be divided into three control modes (e.g., low power mode, medium power mode, and high power mode) based on the magnitude in power supplied to the load 40 outside the vehicle, but may be divided into three or more or two control modes (S300). For example, the control mode may be divided into the low power mode, the medium power mode, and the high power mode based on A[kW] and B[kW], respectively (S310 and S320).

In the deriving of the magnitude in power supplied to the load 40 outside the vehicle (S100), the magnitude in power supplied to the load 40 outside the vehicle may be calculated by averaging power amount for a preset time (e.g., about 60 seconds). In particular, it may be assumed that the magnitude in power supplied to the load 40 outside the vehicle does not change abruptly in real time compared to power consumption due to the running of the vehicle. Therefore, the average value may be calculated while updating a power amount supplied to the load 40 every a preset time (e.g., about 10 seconds), so the magnitude in power supplied to the load 40 outside the vehicle may be calculated. In the determination of the state of charge of the high voltage battery 30 (S200), a ratio (%) between the power amount that may be discharged from the high voltage battery and the maximum chargeable power amount according to the state of the high voltage battery may be determined. The state of the high voltage battery may also be influenced by external environment such as temperature.

Overall, the control may be performed so that as the magnitude in power supplied to the load 40 outside the vehicle is increased, the ratio of power supplied from the fuel cell 10 may be increased. In other words, the ratio at which the fuel cell 10 is operated may be increased toward the high power mode to thus increase supply power ratio of the fuel cell 10. On the other hand, the operation of the fuel cell 10 and the DC converter 20 may be adjusted and thus, as the magnitude in power supplied to the load 40 outside the vehicle is reduced, the ratio of power supplied from the high voltage battery 30 may be increased. In other words, as the fuel cell 10 is operated towards the low power mode, the ratio of stopping the operation of the fuel cell 10 may be increased and the ratio of power supplied from the high voltage battery 30 through the charging or discharging of the high voltage battery 30 may be increased.

A more specific method of controlling an external power supply in a plurality of modes is as follows. Referring to FIG. 3, in the low power mode (S400) among the plurality of modes, when the state of charge of the high voltage battery 30 is equal to or greater than a predetermined first SOC, the operation of the fuel cell 10 may be stopped and only the high voltage battery 30 may be operated to supply power to the load 40 outside the vehicle (S420).

In other words, in the first SOC or greater at which it may be determined that the state of charge of the high voltage battery 30 is sufficient, the operation of the fuel cell 10 may be stopped (S420) and only the high voltage battery 30 may be configured to supply power to the load 40 outside the vehicle. In the first SOC, the high voltage battery 30 may be set not to be required to be charged any longer (S410). In particular, it may be possible to operate the charging/discharging unit 20 to supply power to the load 40 outside the vehicle using the high voltage battery 30 while suppressing boosting of an output voltage of the high voltage battery 30 (S430). A range of the output voltage of the fuel cell 10 may be about 250 to 400 V, and a range of the output voltage of the high voltage battery 30 may be about 180 to 240 V. The charging/discharging unit 20 may be configured to execute the charging or discharging of the high voltage battery 30 and may be configured to perform the voltage boosting between the fuel cell 10 and the high voltage battery 30.

However, when the operation of the fuel cell 10 is stopped and power is supplied to the load 40 only by the high voltage battery 30, the charging/discharging unit 20 may be configured to suppress the boosting of the output voltage of the high voltage battery 30 and thus, the high voltage battery 30 may be discharged by the relatively low output voltage of the high voltage battery 30. In other words, only the output voltage of the high voltage battery 30 or a minimal boosting voltage (e.g., about 10 [V]) may be boosted and supplied to the load 40 (S430).

Since a separate inverter or the like is mounted on the load 40, even if the load 40 is supplied with at a relatively low voltage, and it may be possible to prevent a power conversion efficiency from decreasing due to the boosting by allowing the charging/discharging unit 20 to minimize the boosting. In addition, in the low power mode among the plurality of modes, if the state of charge of the high voltage battery 30 is less than a predetermined second SOC, it may be possible to supply power to the load 40 outside the vehicle while the high voltage battery 30 is charged with the fuel cell 10 (S450). The second SOC may be set to a value sufficient to charge the high voltage battery 30 without discharging the high voltage battery 30 (S440).

The high voltage battery 30 may be charged and the charging power of the charging/discharging unit 20 may be adjusted to be a target power. Specifically, the control may be performed to charge the high voltage battery 30, so the charging power of the charging/discharging unit 20 is adjusted to be a target power. Additionally, the charging power of the charging/discharging unit may be adjusted to be the target power using an error between the target power and the actual charging power of the charging/discharging unit 20 and the preset power gain. The power gain may be preset as parameters calculated based on experiments using a real vehicle.

Particularly, the target power, which is a target value of the charging power of the charger 20, may be set to be equal to or greater than a preset minimum value. In the charging/discharging unit 20, the charging or discharging efficiency is minimal when the charging or discharging are performed in a minimal power range. Therefore, when the charging/discharging unit 20 charges or discharges the high voltage battery 30, the charging/discharging unit 20 may be set to be equal to or greater than a preset minimum value (e.g., about 5 kW), thereby preventing power from wasting due to the charging or discharging. In other words, in the low power mode, the operation of the fuel cell 10 may be maximally stopped and the charging or discharging of the high voltage battery 30 may be maximized to supply power to the load 40 outside the vehicle.

Referring back to FIG. 4, in the medium power mode (S500) among the plurality of modes, when the state of charge of the high voltage battery 30 is equal to or greater than a predetermined third SOC, the charging/discharging unit 20 may be operated to suppress the charging or discharging of the high voltage battery 30 (S520). The third SOC may be set so that the state of charge of the high voltage battery 30 corresponds to an appropriate state (S510). In particular, the charger 20 may be operated to suppress the charging or discharging of the high voltage battery 30 (S520). As described above, when the charging/discharging unit 20 may be charged or discharged in a minimal power range, the charging or discharging efficiency is minimal and thus, when the charging or discharging is unnecessary, the operation of the charging/discharging unit 20 may be stopped or the charging or discharging power may be adjusted to be 0, thereby making it possible to minimize power consumed by the charging/discharging unit 20.

In addition, in the medium power mode among the plurality of modes, when the state of charge of the high voltage battery 30 is less than the predetermined third SOC, it may be possible to supply power to the load 40 outside the vehicle while the high voltage battery 30 is charged with the fuel cell 10 (S570). Even when the charging unit 20 is operated to suppress the charging or discharging of the high voltage battery 30, a sensing offset or the like may be detected in a sensor configured to sense a voltage or power in the charging unit 20. In addition, an error may occur in real time in the load 40 outside the vehicle or the power supply inside the vehicle. Therefore, even when the charging or discharging is operated to be suppressed, minimal charging or discharging may occur and the state of charge of the high voltage battery 30 may be changed.

When the predetermined fourth SOC has the state of charge of the high voltage battery 30 greater than the third SOC, the controller 50 may be configured to stop the operation of the fuel cell 10 and allow only the high voltage battery 30 to supply power to the load 40 outside the vehicle (S540). The fourth SOC corresponds to an appropriate state of consuming the state of charge of the high voltage battery 30 through the discharging while the state of charge of the high voltage battery 30 is sufficient, and may be set to be the same as the first SOC (S530).

The operation of the fuel cell 10 may be stopped and the fuel cell 10 may be operated to be in the stop mode (FC IDLE STOP). In particular, in the stop mode of the fuel cell 10, hydrogen supplied to the fuel cell 10 may be continuously re-circulated, the supply of air to be supplied to the fuel cell 10 may be interrupted, and the driving of the air supply device such as the air blower may be stopped. In particular, it may be possible to operate the high charging/discharging unit 20 to supply power to the load 40 outside the vehicle while suppressing boosting of an output voltage of the high voltage battery 30 (S550). The operation of discharging the high voltage battery 30 may continue until the state of charge of the high voltage battery 30 becomes less than the predetermined third SOC (S560). In other words, in the medium power mode (S500), power may be supplied to the load 40 outside the vehicle using both of the fuel cell 10 and the high voltage battery 30 when the state of charge of the high voltage battery 30 is maintained at the sufficient state.

Referring back to FIG. 5, in the high power mode (S600) among the plurality of modes, when the state of charge of the high voltage battery 30 is less than a fifth SOC, the charging/discharging unit 20 may be operated to suppress the charging or discharging of the high voltage battery 30 (S690). The fifth SOC may be a state in which it is necessary to discharge the high voltage battery 30 with a sufficient state of charge (S610). For example, the fifth SOC may be set equal to the first SOC or the fourth SOC. When the state of charge of the high voltage battery 30 is less than the fifth SOC, the state of charge of the high voltage battery 30 may be determined to be an appropriate level to be able to suppress the charging or discharging of the high voltage battery 30 and allow only the fuel cell 10 to supply power to the load 40 outside the vehicle (S690).

When the state of charge of the high voltage battery 30 is equal to or greater than the fifth SOC, the charging unit 20 may be operated to supply power to the load 40 outside the vehicle by the high voltage battery 30 (S640, S650), and when the magnitude in power supplied to the load 40 outside the vehicle is less than the preset power value (S620), the operation of the fuel cell 10 may be stopped (S630). In other words, when the state of charge of the high voltage battery 30 is equal to or greater than the fifth SOC the high voltage battery 30 may be determined to require discharge and thus, the charging/discharging unit 20 may be operated to allow the high voltage battery 30 to supply power to the load 40 outside the vehicle by the high voltage battery 30 while the high voltage battery 30 is discharged (S630 and S640).

When the charging/discharging unit 20 charges or discharges the high voltage battery 30, the preset minimum value (e.g., about 5 kW) may be charged or discharged as described above. Therefore, the high voltage battery 30 may be charged or discharged with the preset minimum value (e.g., about 5 kW) or greater when the high voltage battery 30 is discharged.

Therefore, under an assumption that the magnitude in power supplied from the high voltage battery 30 to the load 40 outside the vehicle is the preset minimum value (e.g., about 5 kW), when considering the power generation efficiency of the fuel cell 10, the magnitude in power supplied from the fuel cell 10 and the high voltage battery 30 to the load 40 outside the vehicle may be a preset power value (C [kW]) or greater. The preset power value C [kW] may be preset to avoid a section in which the power generation efficiency of the fuel cell 10 and the efficiency of the charging and discharging unit 20 may be dramatically reduced. In other words, since the power generation efficiency of the fuel cell 10 is minimal in a section in which minimal power is generated, when the very low power generation is required, the operation of the fuel cell 10 may be stopped and the fuel cell 10 may enter the FC stop mode (S630). Even when, the boosting of the charging unit 20 may be suppressed (S640).

When the state of charge of the high voltage battery 30 is decreased to an appropriate level (e.g., the third SOC) again while the charging/discharging unit 20 is operated to allow the high voltage battery 30 to supply power to the load 40 outside the vehicle (S660), the charging/discharging unit 20 may be configured to suppress the charging or discharging of the high voltage battery 30 again (S690). When the operation of the fuel cell 10 is stopped, the fuel cell 10 may be operated again and power output from the fuel cell 10 can be supplied to the load 40 outside the vehicle. When the charge of state of the high voltage battery 30 is less than a sixth SOC which may be less than the fifth SOC, the controller 50 may be configured to operate the fuel cell 10 to supply power to the load 40 outside the vehicle while charging the high voltage battery (S680). The sixth SOC may be sufficient to charge the high voltage battery 30 at the minimal level of the state of charge of the high voltage battery 30 and may be set to be the same value as the second SOC (S670).

When the state of charge of the high voltage battery 30 is charged to an appropriate level avoiding a minimal level (e.g., seventh SOC), the charging/discharging unit 20 may be operated to suppress the charging or discharging of the high voltage battery 30 again. In other words, in the high power mode, it may be possible to minimize the charging or discharging of the high voltage battery 30, and supply power to the load 40 outside the vehicle by maximally utilizing the generated power of the fuel cell 10.

Referring back to FIG. 2, after the operation of the fuel cell 10 and the DC converter 20, the method of controlling an external power supply may further include determining the state of the fuel cell 10 (S700 and S800) and operating the fuel cell 10 based on the determined state of the fuel cell 10 (S900). In the steps S700 and S800 of determining the state of the fuel cell 10, whether the fuel cell 10 is in a normal state, a dry state (S810) or a flooding state (S820) may be determined. The state of the fuel cell 10 may be determined using an I-V curve, measuring the impedance of the stack of the fuel cell 10 or the like using the conventional technique.

In response to determining that the fuel cell 10 is in the normal state, the fuel cell 10 may be operated normally (S930). In response to determining that the fuel cell 10 is in the dry state (S810), the operation of the fuel cell 10 may be stopped and the DC converter 20 may be operated to suppress the boosting of the output voltage of the high voltage battery 30 (S910). In other words, in response to determining that the fuel cell 10 is in the dry state, stopping the air supplied to the fuel cell 10 may be required for dry recovery. Therefore, when the state of charge of the high voltage battery 30 is equal to or greater than a minimal level (e.g., the second SOC or the sixth SOC), the fuel cell 10 may be stopped to recover the dry state of the fuel cell 10.

At this time, since only the high voltage battery 30 supplies power to the load 40 outside the vehicle, it may be possible to operate the DC converter 20 to suppress the boosting of the output voltage of the high voltage battery 30. In response to determining that the fuel cell 10 is in the flooding state (S820), it may be possible to add the preset recovery control current to the required current of the fuel cell 10 to adjust the supply of air to the fuel cell 10 (S920).

The supply of air to the fuel cell 10 may be performed by an air blower, an air compressor, or the like. The air supply control of the fuel cell 10 may be performed by a revolutions per minute (RPM) adjustment of the air blower or the air compressor, and the RPM of the air blower or the air compressor may be based on a predetermined map according to the required current of the fuel cell 10. However, when the fuel cell 10 is in the flooding state, more air than the air required for power generation of the required current needs to be supplied to the fuel cell 10, to thus solve the flooding of the fuel cell 10. Therefore, it may be possible to increase the supply of air to the fuel cell 10 by increasing the RPM of the air blower or the air compressor by adding the predetermined recovery control current to the required current of the fuel cell 10.

The magnitude and period of the recovery control current may be preset to an experimental value according to the plurality of modes divided based on the magnitude in power supplied to the load 40 outside the vehicle or the required current of the fuel cell 10. In addition, the duration of the adding of the predetermined recovery control current to the required current of the fuel cell 10 may also be preset to the experimental value.

According to the external power supply system and supply method of the fuel cell vehicle of the present invention, it may be possible to improve the fuel economy by adjusting the optimal power distribution according to the magnitude in power supplied to the load outside the vehicle. Further, it may be possible to operate the fuel cell while keeping the fuel cell in the optimal state by determining the state of the fuel cell in real time even when power is supplied to the load outside the vehicle.

Although the present invention has been shown and described with respect to specific exemplary embodiments, it will be obvious to those skilled in the art that the present invention may be variously modified and altered without departing from the spirit and scope of the present invention as defined by the following claims

What is claimed is:

1. An external power supply system of a fuel cell vehicle, comprising:
    a fuel cell;
    a high voltage battery connected to the fuel cell via a main bus terminal;
    a charging/discharging unit configured to execute charging or discharging of the high voltage battery;
    a power supply line branched from the main bus terminal and connected to a load outside the vehicle to supply power of the fuel cell or the high voltage battery to the load outside the vehicle; and
    a controller configured to operate the fuel cell and the charging/discharging unit based on a magnitude in power supplied to the load outside the vehicle and a state of charge (SOC) of the high voltage battery,
    wherein the power supply line is connected in parallel between the fuel cell and the charging/discharging unit to supply power from the fuel cell or the high voltage battery by the charging/discharging unit to the load outside the vehicle.

2. The external power supply system of claim 1, wherein the charging/discharging unit is a direct current (DC) converter disposed at the main bus terminal between the fuel cell and the high voltage battery.

3. The external power supply system of claim 1, wherein the controller is configured to adjust a ratio of power supplied from the fuel cell to be increased as the magnitude in power supplied to the load outside the vehicle is increased.

4. The external power supply system of claim 1, wherein the controller is configured to adjust a ratio of power supplied from the high voltage battery to be increased as the magnitude in power supplied to the load outside the vehicle is decreased.

5. The external power supply system of claim 1, wherein the controller is configured to divide a control mode into a plurality of control modes based on the magnitude in power supplied to the load outside the vehicle, and stop the operation of the fuel cell and allow only the high voltage battery to supply power to the load outside the vehicle when a state of charge of the high voltage battery is equal to or greater than a predetermined first SOC, in a low power mode among the plurality of modes.

6. The external power supply system of claim 5, wherein the controller is configured to allow the high voltage battery to supply power to the load outside the vehicle when the charging/discharging unit suppresses boosting of an output voltage of the high voltage battery.

7. The external power supply system of claim 1, wherein the controller is configured to divide a control mode into a plurality of control modes based on the magnitude in power supplied to the load outside the vehicle, and supply power to the load outside the vehicle while charging the high voltage battery with the fuel cell when a state of charge of the high voltage battery is less than a predetermined second SOC, in a low power mode among the plurality of modes.

8. The external power supply system of claim 1, wherein the controller is configured to divide a control mode into a plurality of control modes based on the magnitude in power supplied to the load outside the vehicle, and operate a charging/discharging unit to suppress the charging or discharging of the high voltage battery when the state of charge of the high voltage battery is equal to or greater than a predetermined third SOC, in a medium power mode among the plurality of modes.

9. The external power supply system of claim 8, wherein the controller is configured to stop the operation of the fuel cell and allow only the high voltage battery to supply power to the load outside the vehicle, when the state of charge of the high voltage battery is equal to or greater than a predetermined fourth SOC which is greater than the third SOC.

10. The external power supply system of claim 1, wherein the controller is configured to divide a control mode into a plurality of control modes based on the magnitude in power supplied to the load outside the vehicle, and operate a charging/discharging unit to suppress the charging or discharging of the high voltage battery when the state of charge of the high voltage battery is less than a fifth SOC, in a high power mode among the plurality of modes.

11. The external power supply system of claim 10, wherein the charging unit is operated to supply power to the load outside the vehicle by the high voltage battery when the state of charge of the high voltage battery is equal to or greater than the fifth SOC, and the operation of the fuel cell is stopped when the magnitude in power supplied to the load outside the vehicle is less than the preset power value.

12. The external power supply system of claim 10, wherein the controller is configured to operate the fuel cell to supply power to the load outside the vehicle while charging the high voltage battery when the charge of state of the high voltage is less than a sixth SOC which is less than the fifth SOC.

13. An external power supply method of a fuel cell vehicle of claim 1, comprising:
deriving, by the controller, a magnitude in power to be supplied to the load outside the vehicle;
determining, by the controller, a state of charge of the high voltage battery; and
operating, by the controller, the fuel cell and the charging/discharging unit based on the derived magnitude in power supplied to the load outside the vehicle and the determined state of charge of the high voltage battery together.

14. The external power supply method of claim 13, wherein in the operation of the fuel cell and the DC converter, the control mode is divided into a plurality of control modes based on the magnitude in power supplied to the load outside the vehicle, and the operation of the fuel cell and the DC converter are adjusted so that as the magnitude in power supplied to the load outside the vehicle is increased, the ratio of power supplied from the fuel cell is increased and as the magnitude in power supplied to the load outside the vehicle is reduced, the ratio of power supplied from the high voltage battery is increased.

15. The external power supply method of claim 13, further comprising:
determining, by the controller, the state of the fuel cell after operating the fuel cell and the DC converter; and
operating, by the controller, the fuel cell based on the determined state of the fuel cell.

16. The external power supply method of claim 15, further comprising:
in response to determining that the fuel cell is in a dry state in the determining of the state of the fuel cell, stopping, by the controller, the operation of the fuel cell and operating the DC converter to suppress boosting of an output voltage of the high voltage battery.

17. The external power supply method of claim 15, further comprising:
in response to determining that the fuel cell is in a flooding state adjusting, by the controller, the supply of air to the fuel cell by adding a preset recovery control current to a required current of the fuel cell.

* * * * *